(12) United States Patent
Bennett

(10) Patent No.: US 8,306,505 B2
(45) Date of Patent: Nov. 6, 2012

(54) METHOD AND APPARATUS FOR TRANSFERRING IDENTITY INFORMATION TO A WIRELESS DEVICE FOR TEMPORARY USE

(75) Inventor: Steven John Bennett, Coquitlam (CA)

(73) Assignee: Sierra Wireless, Inc., Richmond (CA)

( * ) Notice: Subject to any disclaimer, the term of this patent is extended or adjusted under 35 U.S.C. 154(b) by 149 days.

(21) Appl. No.: 12/854,093

(22) Filed: Aug. 10, 2010

(65) Prior Publication Data
US 2012/0040641 A1 Feb. 16, 2012

(51) Int. Cl.
*H04W 88/02* (2009.01)
(52) U.S. Cl. ......................................... 455/411
(58) Field of Classification Search .............. 455/411, 455/433, 434, 435.2, 445, 558; 370/338, 370/352
See application file for complete search history.

(56) References Cited

U.S. PATENT DOCUMENTS

| | | | |
|---|---|---|---|
| 5,956,636 A | 9/1999 | Lipsit |
| 6,052,600 A | 4/2000 | Fette |
| 6,393,408 B1 | 5/2002 | Mosher |
| 6,622,017 B1 | 9/2003 | Hoffman |
| 6,628,934 B2 | 9/2003 | Rosenberg |
| 6,636,489 B1 | 10/2003 | Fingerhut |
| 6,785,556 B2 | 8/2004 | Souissi |
| 6,792,271 B1 | 9/2004 | Sherman |
| 6,871,063 B1 | 3/2005 | Schiffer |
| 6,934,544 B2 | 8/2005 | Cooper |
| 6,961,567 B1 | 11/2005 | Kuhn |
| 6,985,931 B2 | 1/2006 | Dowling |
| 6,996,537 B2 | 2/2006 | Minear |
| 7,035,595 B1 | 4/2006 | Kim |
| 7,106,816 B2 | 9/2006 | Filipovic |
| 7,113,766 B2 | 9/2006 | Horel |
| 7,319,870 B2 | 1/2008 | Olson |
| 7,324,816 B2 | 1/2008 | Sherman |
| 7,363,056 B2 | 4/2008 | Faisy |
| 7,917,133 B2 | 3/2011 | Payne |
| 2002/0081992 A1 | 6/2002 | Keller |

(Continued)

FOREIGN PATENT DOCUMENTS
EP 1 703 760 A2 9/2006
(Continued)

OTHER PUBLICATIONS

"Smart Cards; UICC Application Programming Interface and Loader Requirements; Service Description; (Release 6)," Technical Specification ETSI TS 102 240 (V6.0.0), European Telecommunications Standards Institute, Sophia Antipolis, France, Jul. 2002, 18 pages.
Office Action mailed Mar. 6, 2012, from U.S. Appl. No. 12/498,022, filed Jul. 6, 2009, 14 pages.

*Primary Examiner* — Diane Mizrahi
(74) *Attorney, Agent, or Firm* — Christensen O'Connor Johnson Kindness PLLC

(57) ABSTRACT

A method and apparatus for transferring identity information for temporary use by a wireless device, visiting a foreign operator network, is provided. The wireless device is identified as foreign to the operator network and presented with an opportunity to download a temporary identity which is recognized by the operator network as belonging to a local subscriber. The temporary identity, once installed on the wireless device, makes the wireless device appear as a local subscriber. Upon termination of use, the temporary identity is returned to a pool and usable for another wireless device.

18 Claims, 5 Drawing Sheets

U.S. PATENT DOCUMENTS

| | | |
|---|---|---|
| 2002/0197991 A1 | 12/2002 | Anvekar |
| 2003/0064723 A1 | 4/2003 | Thakker |
| 2003/0163350 A1 | 8/2003 | Rudowski |
| 2004/0210450 A1 | 10/2004 | Atencio |
| 2005/0101323 A1* | 5/2005 | De Beer ..................... 455/435.2 |
| 2006/0063534 A1 | 3/2006 | Kokkonen |
| 2006/0291483 A1 | 12/2006 | Sela |
| 2007/0078924 A1 | 4/2007 | Hassan |
| 2007/0129078 A1* | 6/2007 | De Beer ........................ 455/445 |
| 2008/0020760 A1* | 1/2008 | Elkarat et al. ................. 455/433 |
| 2008/0081611 A1 | 4/2008 | Hoyt |
| 2008/0188218 A1 | 8/2008 | Sherman |
| 2009/0154675 A1 | 6/2009 | Hanson |
| 2009/0158148 A1 | 6/2009 | Vellanki |
| 2009/0163175 A1 | 6/2009 | Shi |
| 2012/0039323 A1* | 2/2012 | Hirano et al. ................. 370/338 |

FOREIGN PATENT DOCUMENTS

| | | |
|---|---|---|
| EP | 2 139 180 A1 | 12/2009 |
| EP | 2 161 963 A1 | 3/2010 |
| WO | 02/13554 A1 | 2/2002 |
| WO | 2005/043826 A1 | 5/2005 |
| WO | 2009/053918 A2 | 4/2009 |

\* cited by examiner

METHOD AND APPARATUS FOR TRANSFERRING IDENTITY INFORMATION TO A WIRELESS DEVICE FOR TEMPORARY USE

TECHNICAL FIELD

The present invention pertains in general to wireless communications and in particular to a method and apparatus for transferring identity information, for example of the kind stored on a universal integrated circuit card (UICC), to a wireless device for temporary use.

BACKGROUND

Wireless networks in general, and cellular networks, such as GSM, UMTS, CDMA and other networks, in particular, typically require wireless devices, such as mobile phones, PDAs or other cellular devices, to present identity information before granting access to the network. This identity information is used for example for billing purposes, for routing communication to the wireless device, identifying the wireless device within a network, and the like. Identity information may be associated with an identity module, such as a subscriber identity module (SIM), CDMA SIM (CSIM), Universal SIM (USIM), or the like. For example, identity information may include an international mobile subscriber identity (IMSI) number, as stored in a SIM and used to identify a subscriber to GSM and UMTS networks.

Identity information may be stored on a removable or non-removable storage medium or smart card, such as a universal integrated circuit card (UICC). A UICC may hold multiple applications, corresponding to different identity modules. Thus, the same UICC can potentially be used with different networks operating in accordance with different standards. The UICC smart card typically consists of a CPU, ROM, RAM, EEPROM and I/O circuits, and is configured to run one or more applications such as identity module applications.

Mobile devices are typically associated with a home network via the identity information stored thereon, but are often required to connect to other networks, for example while travelling or roaming. Current billing arrangements and roaming agreements can make it expensive to use communication networks other than a home network. For example a user may subscribe to a service that allows the communication of tens of Megabytes of data for an acceptable monthly fee, but may be charged a much higher fee per Megabyte when roaming in other countries or service areas. This expense can discourage the use of communications services when roaming. Those who are unaware of the expense of service are frequently surprised when they receive an expensive bill and this leads to disputes with the service providers.

One of the reasons for such high costs is an ongoing lack of trust between service providers with respect to billing. In some cases visitors to a foreign location may have their data traffic sent via an expensive dedicated leased connection back to their home service provider so that billing can be performed by their home service provider. This may ensure accuracy of invoicing but does not serve the user in terms of reasonable price for the service. The limitations of the link also introduce delay and may limit the speed of the connection.

Some technically knowledgeable users who travel frequently may obtain a wireless device that can accept the UICC card of any service provider. This can be achieved by purchasing a device that has been unlocked, or by paying a fee to get a code from their home service provider to enable unlocking. Buying an unlocked device is more expensive to the user at the outset than buying a device that is locked and subsidized by their home network operator. In an unlocked device the user may remove a UICC card configured for use with their home network, and install a UICC card purchase one from another, more local provider in order to take advantage of lower rates. This is an inconvenience in that the removal and exchanging of the card can require the device to be opened up and the battery removed before access to the card can be achieved. It is also inconvenient where the device has voice capability, as the card defines the telephone number of the device because the number changes when the card is changed.

Therefore there is a need for a solution that overcomes at least one of the deficiencies in the art.

This background information is provided to reveal information believed by the applicant to be of possible relevance to the present invention. No admission is necessarily intended, nor should be construed, that any of the preceding information constitutes prior art against the present invention.

SUMMARY

This summary is provided to introduce a selection of concepts in simplified form that are further described below in the detailed description. This summary is not intended to identify key features of the claimed subject matter, nor is it intended to be used as an aid in determining the scope of the claimed subject matter.

An object of the present subject matter is to provide a method and apparatus for transferring identity information to a wireless device for temporary use. According to an aspect of the present invention there is provided a method for enabling a wireless device for local operation with a foreign operator network, the method comprising: identifying the wireless device as foreign to the operator network; and transferring, via wireless communication, local identity information to the wireless device, the local identity information being configured for temporary use by the wireless device, the local identity information being further suitable for temporary use by one or more other wireless devices after said temporary use by the wireless device.

According to another aspect of the present invention there is provided an apparatus for enabling a wireless device for local operation with a foreign operator network, the apparatus operatively coupled to the operator network and comprising: a monitoring module configured to monitor the operator network to identify the wireless device as foreign to the operator network; and an interface module configured to transfer local identity information to the wireless device via the operator network, the local identity information being configured for temporary use by the wireless device, the local identity information being further suitable for temporary use by one or more other wireless devices after said temporary use by the wireless device.

According to another aspect of the present invention there is provided a non-transitory computer program product comprising a memory having computer readable code embodied therein, for execution by a CPU, for performing a method for enabling a wireless device for operation with an operator network, the method comprising: identifying the wireless device as foreign to the operator network; and transferring, via wireless communication, local identity information to the wireless device, the local identity information being configured for temporary use by the wireless device, the local identity information being further suitable for temporary use by one or more other wireless devices after said temporary use by the wireless device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Definitions

Figure 1:
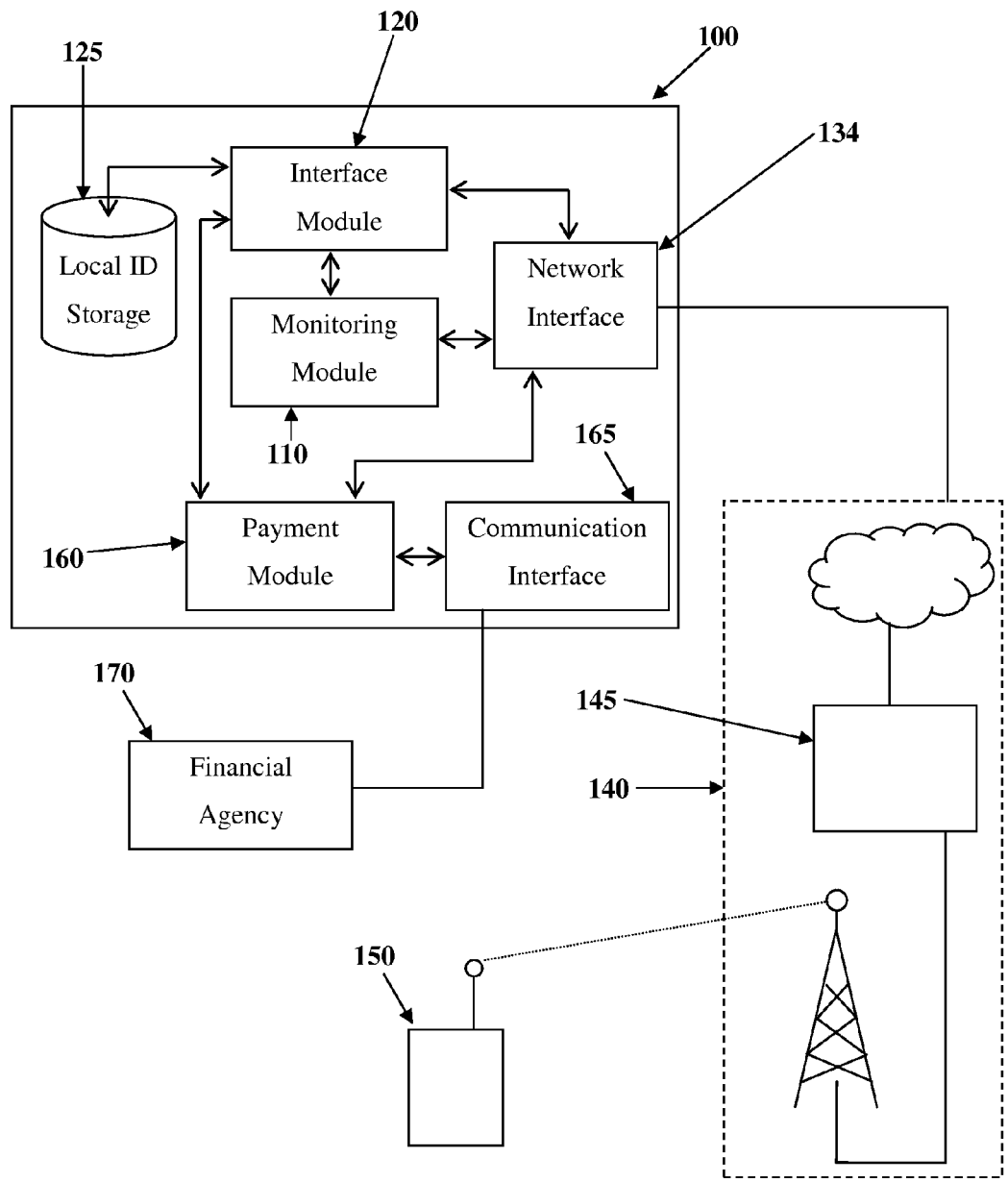
FIG. 1 illustrates an apparatus for enabling a wireless device for local operation with a foreign operator network, in accordance with embodiments of the present subject matter.

The term "wireless device" is used to refer to an apparatus for analog and/or digital transmission and/or reception of signals for communication purposes via electromagnetic radiation propagating, for example, through vacuum, or air, or a generally non-conductive medium to or from another apparatus. The wireless device may use signals formatted according to one or more of a number of communication systems including mobile phone networks such as cellular networks, or other current or future wireless communication systems, for example. A wireless device can comprise or be included in one or more of various forms of handheld or mobile device such as a radio, mobile phone, cellular phone, satellite phone, media player, smartphone, or a personal computer (PC) such as a desktop, notebook, tablet PC, personal digital assistant (PDA), game console, or peripherals such as a printer, camera, pointing device, or other apparatus, for example.

In accordance with embodiments of the present subject matter, a wireless device is configured to hold identity information, for example on a removable or non-removable smart card, such as a UICC. Identity information may be associated with an application such as a SIM, CSIM, USIM, or the like. Identity information may comprise one or more identifiers such as telephone number, IMSI, IMEI, ESN, MEID, MSISDN, password, PIN, username, user information, network affiliations, country or regional affiliations, and the like.

The term "base station" is used to refer to a wireless device operating as an access point for coupling other wireless devices, such as mobile phones, to other parts of a communication network. The base station comprises a radio transceiver for communication with the other wireless devices in accordance with one or more wireless communication protocols, for example cellular communication protocols such as CDMA, CDMA2000, UMTS, GSM, LTE, or other wireless protocols, such as WLAN protocols. The base station further comprises an interface to a wired or wireless backhaul or other infrastructure for coupling with the other parts of the communication network, such as a mobile network operator's core network, the Internet, or a combination thereof, or the like. A base station may be, for example, a wireless access point, a macrocell, microcell, picocell or femtocell base station, a base transceiver station (BTS), a NodeB, an evolved NodeB, or the like.

The term "operator network" is used to refer to a communication network comprising one or more base stations and operated by one or more entities, such as a business entity, wireless service provider, government or public entity, alliance of private citizens, businesses or corporations, or the like. As used herein, the term "foreign operator network" refers to an operator network with respect to which a wireless device under discussion is not currently a local or direct subscriber. Such a wireless device may also be reciprocally referred to as foreign to the operator network. As an example, a device which does not belong to an operator's subscription service may be deemed as foreign to that operator's network or networks.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this subject matter belongs.

In accordance with an aspect of the present subject matter, there is provided a method for enabling a wireless device for local operation with a foreign operator network. A wireless device, visiting a foreign operator network, may be enabled for local operation for example if it is recognized by the foreign operator network as equivalent to a local subscriber of the foreign operator network. Local operation is contrasted with conventional methods such as operation under a roaming agreement, in which a wireless device is not recognized as equivalent to a local subscriber. The method comprises identifying the wireless device as foreign to the operator network, for example by monitoring communication operations of the operator network, monitoring databases or registries tracking foreign devices currently within jurisdiction of the operator network, monitoring for user-generated request for services, or the like. The method further comprises transferring, via wireless communication, local identity information, such as identity information of the kind stored on a UICC, recognized by the operator network as being associated with a local subscriber, to the wireless device. The local identity information is suitable for temporary use by the wireless device, to facilitate operation with the operator network as a local subscriber, and is further suitable for temporary use by one or more other wireless devices after said temporary use by the wireless device.

In accordance with another aspect of the present subject matter, there is provided an apparatus for enabling a wireless device for local operation with a foreign operator network. The apparatus is operatively coupled to the operator network, for example via a wired or wireless communication link, and communicates with wireless devices via the operator network. The apparatus comprises at least a monitoring module and an interface module. The monitoring module is configured to monitor the operator network to identify the wireless device as foreign to the operator network, for example by monitoring communications, registries or databases associated with the operator network. The interface module is configured to transfer local identity information to the wireless device via the operator network. The local identity information may be retrieved from a database containing currently available local identity information instances, for example.

In accordance with embodiments of the present subject matter, the wireless device is configured to temporarily adopt the identity information as its own so as to appear as equivalent to a local subscriber. For example, this may involve configuring and launching a SIM application or the like, which incorporates the local identity information.

Transferring of the local identity information to the wireless device is typically performed subsequently to interfacing with a user of the wireless device, for example to obtain authorization and payment or credit information. In some embodiments, the present subject matter is additionally directed toward obtaining payment information via wireless communication with the wireless device, said payment information for use in recovering payment related to temporary use of the local identity information by the wireless device in accordance with a predetermined service agreement; and initiating a request for payment based at least in part on said payment information. For example, the present invention may be configured to communicate with a wireless device to: offer use of local identity information for a fee; receive a message accepting or declining the offer; request, receive and authenticate payment information upon acceptance; and communicate the required local identity information to the wireless device upon receipt and authentication of the payment information.

In some embodiments, the present subject matter is further directed toward storing a plurality of different identity information instances in computer memory, and accessing the computer memory to acquire the local identity information corresponding to a selected identity information instance stored therein. The selected identity information instance corresponds to an instance which is marked as currently unused. Once it has been selected and possibly provided to the wireless device for use, the selected identity information instance is marked as currently in-use. The computer memory may be organized as a database or other data structure, for example, and marking a selected identity information instance may comprise marking a first field in the database or data structure, the first field being linked to a second field containing the appropriate identity information instance. In a further embodiment, the present subject matter may be additionally directed toward: monitoring the wireless device for completion of temporary use of the local identity information; and upon completion of temporary use of the local identity information by the wireless device, marking the selected identity information instance as currently unused. Therefore, an identity information instance may be "checked out" of the database when it is being used, and subsequently "checked in" again once it is no longer required. Identity information instances may therefore be supplied serially to different wireless devices, typically with the restriction that a single identity information instance is only used by one wireless device at a time, although this restriction may be relaxed if feasible.

FIG. 1 illustrates an apparatus 100 for enabling a wireless device 150 for local operation with an operator network 140, in accordance with embodiments of the present subject matter. The apparatus 100 is operatively coupled, via a network interface 134, to an operator network 140, to which a foreign wireless device 150 may connect. The apparatus 100 comprises a monitoring module 110 and an interface module 120. The monitoring module 110 is operatively coupled to the operator network 140 via the network interface 134 and configured to monitor the operator network 140 to identify one or more events corresponding to connection of foreign wireless devices, such as wireless device 150, thereto. In some embodiments, this may involve involvement of the network operator to grant the apparatus 100 access to information held by the operator network 140. For example, the monitoring module 110 may be configured to monitor data held in a register or server 145 of the operator network 140. Once the wireless device 150 is identified by the apparatus 100, and typically after initial interaction between the apparatus 100 and the wireless device 150, via the operator network 140, the interface module 120 communicates with the wireless device 150 to transfer local identity information thereto, again via the operator network 140. The local identity information may be transferred in an appropriate format and to an appropriate degree such that the wireless device 150 is able to use the local identity information as its own identity, at least for purposes of interfacing with the foreign operator network, for example to run a SIM or other application on a smart card or smart card emulator, or the like. The interface module 120 typically obtains the local identity information from computer memory 125, which may contain a pool of identity information instances, for example in a database. In some embodiments, the interface module 120 may further be configured to manage initial and ongoing interactions with the wireless device, for example to offer services and receive acceptance of offers, to obtain and acknowledge receipt of payment information, to obtain and acknowledge notifications of termination of services, and the like.

In some embodiments, the apparatus 100 may further comprise a payment module 160. The payment module 160 is configured to communicate with the wireless device, via the interface module 120 and/or network interface 134, to obtain payment information for use in recovering payment related to use of the local identity information by the wireless device 150. The payment module 160 is further configured to initiate a request for payment based at least in part on said payment information, for example by contacting a financial agency such as a credit card, bank, escrow service, or the like, identified in the payment information. In some embodiments, the service may be pre-paid.

In some embodiments, the apparatus 100 may be a computer or computer server, comprising a processor operatively coupled to computer memory. The computer memory contains instructions for operation of the apparatus, including the monitoring module 110, the interface module 120, and optionally the payment module 160. The computer memory may also contain the pool of identity information instances and instructions for execution by the processor for managing same. The apparatus 100 may further comprise a network interface 134 for operatively coupling to one or more devices in the operator network 140, thereby facilitating communicative coupling therewith. The network interface 134 may be, for example an Ethernet™ interface, IP interface, ATM interface, SS7 interface, or other optical, wired or wireless interface comprising one or more standard or proprietary protocols for interfacing with the operator network 140, as would be readily understood by a worker skilled in the art. The payment module 160 may include a communication interface 165 for contacting a financial agency 170 for requesting payment associated with use of the local identity information. The communication interface 165 may be an interface for communicating with the Internet, for example. In some embodiments, the network interface 134 and communication interface 165 may be unified into a single interface, for example comprising a communication interface operatively coupled to the Internet and the operator network 140.

Embodiments of the present subject matter may comprise functional equivalents of the apparatus 100 as illustrated in FIG. 1. For example, embodiments may comprise plural computer devices each comprising one or more of a payment module, a monitoring module, and an interface module, along with appropriate interfaces and data storage. The plural computer devices may be configured to communicate with each other and cooperate so as to provide operation of an apparatus in accordance with the present subject matter.

Figure 2:
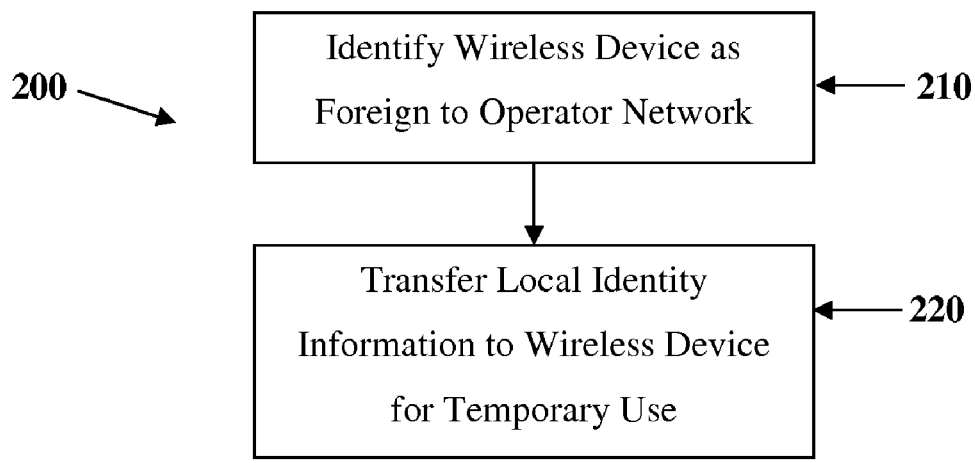
FIG. 2 illustrates a method for enabling a wireless device for local operation with a foreign operator network, in accordance with embodiments of the present subject matter.

FIG. 2 illustrates a method 200 for enabling a wireless device for local operation with an operator network in accordance with embodiments of the present subject matter. The method 200 comprises identifying 210 the wireless device as foreign to the operator network, and wirelessly transferring 220 local identity information to the wireless device for temporary use thereby.

Figure 3:
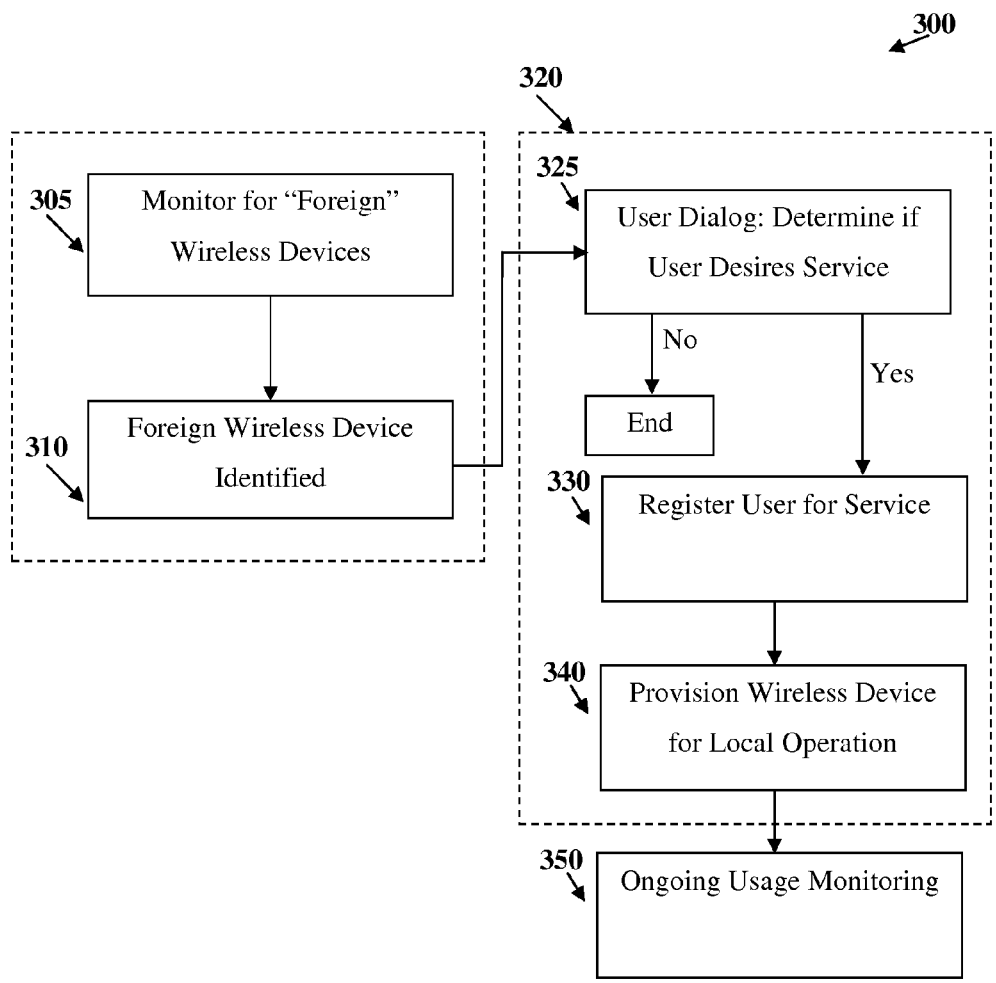
FIG. 3 illustrates another method for enabling a wireless device for local operation with a foreign operator network, in accordance with embodiments of the present subject matter.

FIG. 3 illustrates a method 300 for enabling wireless devices for local operation with an operator network in accordance with embodiments of the present subject matter. The method 300 comprises monitoring 305 connections of wireless devices to the operator network to determine if and when foreign wireless devices connect to the operator network. Monitoring 305 may comprise, for example, monitoring of databases or registries of the operator network, or the like. Once a wireless device is identified 310 as foreign to the operator network, interfacing 320 with the identified foreign wireless device occurs. Interfacing 320 comprises wireless communication with the wireless device via the operator network, including an initial user dialog 325 for determining if a user of the wireless device desires the service, a registration operation 330 for obtaining user identification and/or payment information, and a provisioning operation 340 which, upon successful completion of the registration operation 330, comprises transferring the local identity to the wireless device. The local identity information may be transferred in an appropriate format and to an appropriate degree such that the wireless device is able to use the local identity information as its own identity, at least for purposes of interfacing with the foreign operator network. The method may further comprise monitoring 350 usage of the local identity by the wireless device and/or receipt of update messages 360 indicative of termination or adjustment of provided services, or the like. Usage monitoring 350 may comprise monitoring data obtained by the wireless network indicative of activity of the wireless device and/or receiving update messages from the operator network, which may be initiated either by the wireless device or by the operator network. Usage monitoring may be used to derive payment information and/or to determine when the local identity information is no longer required by a wireless device, thereby allowing it to be released for use by another wireless device.

In some embodiments, a monitored database or registry which includes information regarding wireless devices foreign to the operator network may be a visitor location register (VLR), or the like. As would be readily understood by a worker skilled in the art, a VLR facilitates roaming agreements by tracking foreign wireless devices currently visiting an operator network. Another registry or database which may include information regarding wireless devices foreign to the operator network may be one associated with a RADIUS server.

In an example scenario in accordance with embodiments of the present subject matter, a wireless device initially connects to the foreign operator network upon arrival or power-on. This connection may be facilitated by existing roaming methods, which utilize identity information already stored in the wireless device. The wireless device is subsequently presented with an offer to connect to the foreign network using local identity information downloaded from a pool of local identities. The pool of local identities, which in some embodiments may be referred to as virtual UICC identities, may be provided by the foreign operator network. Usage of a local identity may be monitored and billed to the wireless device or user thereof using a payment method such as PayPal or Visa. A variety of different payment offers for different amounts of data and periods of time could be offered for the user to select from. A billing event may be triggered automatically, for example periodically, upon predetermined billing amounts being reached, upon completion of temporary use of the local identity, or the like, or a combination thereof.

In some embodiments, a foreign device may be a wireless device primarily serviced by another service provider covering the same geographical area, territory or country as the foreign operator network. This may provide wireless device users with an option to purchase service at a competitive rate.

In some embodiments, the user may have an option to initiate providing of services by telephoning an operator or representative of a service provider offering said services, sending an email, text or SMS message or by accessing a Web site. The user may thus initiate the step of identifying the wireless device as being foreign to the operator network through such an action, and identifying wireless devices as foreign to the operator network may comprise monitoring for user-generated requests for service. Such actions may be performed by the mobile device, for example by using the network of another service provider or using a roaming data service. The user-initiated option may be used, for example to enable services if the automatic discovery fails or the user changes his/her mind about getting service.

In some embodiments, a wireless device may be identified as foreign to the operator network and offered services one time, or periodically, for example daily, if the user initially declines the service. This may provide users who have not accepted the local service further chances to obtain the service. The user may be offered an option to cancel the reminders if not they are not welcome.

In some embodiments, once a wireless device has been identified as foreign to the operator network, or if the user initially declines services, a message, such as an email or text, may be sent to the mobile device containing instructions about how to initiate the service.

In some embodiments, a wireless device may be associated with pre-authorized local service for one or more designated countries or foreign operator networks. In this case setup of services may be fully automatic, requiring no user decision or input. In some embodiments, the user is presented with an advisory message to inform the user of the service in use.

In some embodiments, temporary use of local identities is administered by an operator or service provider to which those identities are registered and local. Administration may be performed by the operator or service provider independently, by a separate business, or in co-operation with the one or more other service providers that could have negotiated a group rate. In some embodiments, a separate business may be able to offer services in co-operation with a plurality of service providers. For example, a business may allow wireless device users to sign up for a global roaming package, or one that bundles predetermined services for selected countries or regions and/or service providers of interest. This approach enables such a business to offer the convenience of a single invoice to a user for all roaming service.

In some embodiments, to enhance security, temporary identity information may be protected from duplication or tampering. For example, a token system may be implemented to allow a temporary identity information instance to be used only by one wireless device at a given time. For example, before an identity information instance is lent out for temporary use by a wireless device, the wireless device may be required to provide an authenticated token indicative of its permanent identity. In some embodiments, the token may be strongly associated with the wireless device's home identity information. That is, the wireless device may be required to communicate its home identity information in order to receive temporary identity information.

In some embodiments, plural temporary identity information instances are stored in a database and transferred, as needed, to wireless devices for use thereby. Prior to transferring, the method, apparatus and computer program product according to embodiments of the present subject matter may be configured to obtain information indicative of a permanent identity of the wireless device or user thereof, and/or payment information for use in recovering payment related to use of the temporary identity information by the wireless device in accordance with a predetermined service agreement. For example, after an initial user dialog in which the user agrees to subscribe to a service offering the temporary identity, the wireless device may transmit, based on the user's input and/or authorization, permanent identity information and/or payment information. Permanent identity information may include a permanent telephone number, IMSI, IMEI, ESN, MEID, MSISDN, user name, user address, or the like. Payment information may include a credit card number, PayPal™ account number, bank account number, escrow service account number, proof of prepayment, acceptable promise to pay, or the like.

In some embodiments, a wireless device, such as a data device, may receive and display a welcome message upon entry to a new roaming service area containing a foreign operator network. The welcome message may include an option to either continue to connect to the foreign operator network in a conventional manner, for example roaming, or to connect using temporary identity information, thereby operating as equivalent to a local device relative to the foreign network. In some embodiments, release of the temporary identity information may be automatic upon departure from the foreign operator's area of coverage, triggered for example by a predetermined timeout, removal of the wireless device from an operator registry, or the like.

In embodiments of the present subject matter, the wireless device, upon obtaining and installing the local identity information, becomes equivalent to a device holding a valid local subscription to services of the operator network. Billing is therefore managed by the operator network and/or a business entity to which the local identity is registered.

A potential advantage of embodiments of the present subject matter is that it may be used to reduce or eliminate the practice of backhauling the user's data to the user's home country in order for billing to be managed by their home service providers.

Another potential advantage of embodiments of the present subject matter is that it may be used to reduce or eliminate the need to carry multiple UICCs or other smart cards when travelling, and to physically change cards. This is particularly problematic when UICC or other identity electronics are built into a wireless device, or when a wireless device is locked to a particular UICC.

In some embodiments, the present subject matter may be used to enable a wireless device to operate as equivalent to a local subscriber for use of voice services, data services, or both. When the wireless device operates as a local-subscriber-equivalent in terms of voice services, it may receive a local telephone number. In some embodiments, a wireless device may be configured to use its permanent identity information for voice services and its temporary identity information for data services, or vice-versa. A wireless device may thus be configured to run multiple concurrent SIM applications, or the like. In some embodiments, a wireless device may be configured to operate concurrently as both a roaming device and a local-equivalent device, by virtue of multiple concurrent operating SIM or like applications. In this case, the wireless device may be configured with prioritization rules to determine which identity to use for outgoing voice calls and/or outgoing data transmissions.

Temporary local identity information may be used by the wireless device to operate as equivalent to a local subscriber. For example, the temporary local identity information may be used for providing or modifying an application, such as a SIM, USIM, CSIM application or the like, running on the mobile device or smart card, such as a UICC, thereof. The temporary local identity information may comprise executable code, for example corresponding to an executable SIM, USIM or CSIM application or a portion thereof, source code or other information for use in creating and/or compiling appropriate executable code, data fields usable to modify an existing application or executable code thereof, or the like, or a combination thereof. In some embodiments, temporary local identity information may comprise an applet file or the like wirelessly communicated to the wireless device and implemented thereon, as described for example in "ETSI TS 102 240 v6.0.0, Technical Specification: Smart Cards; UICC Application Programming Interface and Loader Requirements; Service Description; (Release 6)," European Telecommunications Standards Institute, 2002.

For example, in some embodiments, the temporary local identity information comprises code of a SIM application, which may be downloaded, installed and executed by a UICC of the wireless device. The SIM application may contain temporary identity information such as a serial number, IMSI, authentication and ciphering information, passwords, list of authorized services, network information, and the like. This information is configured to be recognized by the operator network as belonging to a local subscriber thereof. All or a portion of the information may be pre-registered with the operator network to this end.

Local identity information for use by a wireless device to configure, compile, and/or execute an identity application such as a SIM application may be transferred and implemented in various ways. In some embodiments, the identity application may be stored and/or executed on a smart card, off a smart card, or a combination thereof. In some embodiments, the identity application may be executed on a smart card emulator running on the wireless device. Various methods of programming, providing and executing secure or unsecure smart card applications may be used as would be readily understood by a worker skilled in the art.

In some embodiments, a wireless device may be configured to concurrently hold its own previous identity information as well as the temporary local identity information obtained in accordance with the present invention. For example, the wireless device may operate plural applications such as SIM applications concurrently on a UICC thereof, one for its own "permanent" identity and one for its temporary identity. In some embodiments, this may enable the wireless device to at least receive calls and data addressed to either the permanent or temporary identity, while preferably using the temporary identity to send data.

In some embodiments, the present subject matter may be used in conjunction with Mobile IP or other data forwarding methods, to allow the wireless device to retain at least a portion of its connectivity of its "permanent" identity while taking advantage of efficiency and economy of its temporary identity.

Figure 4:
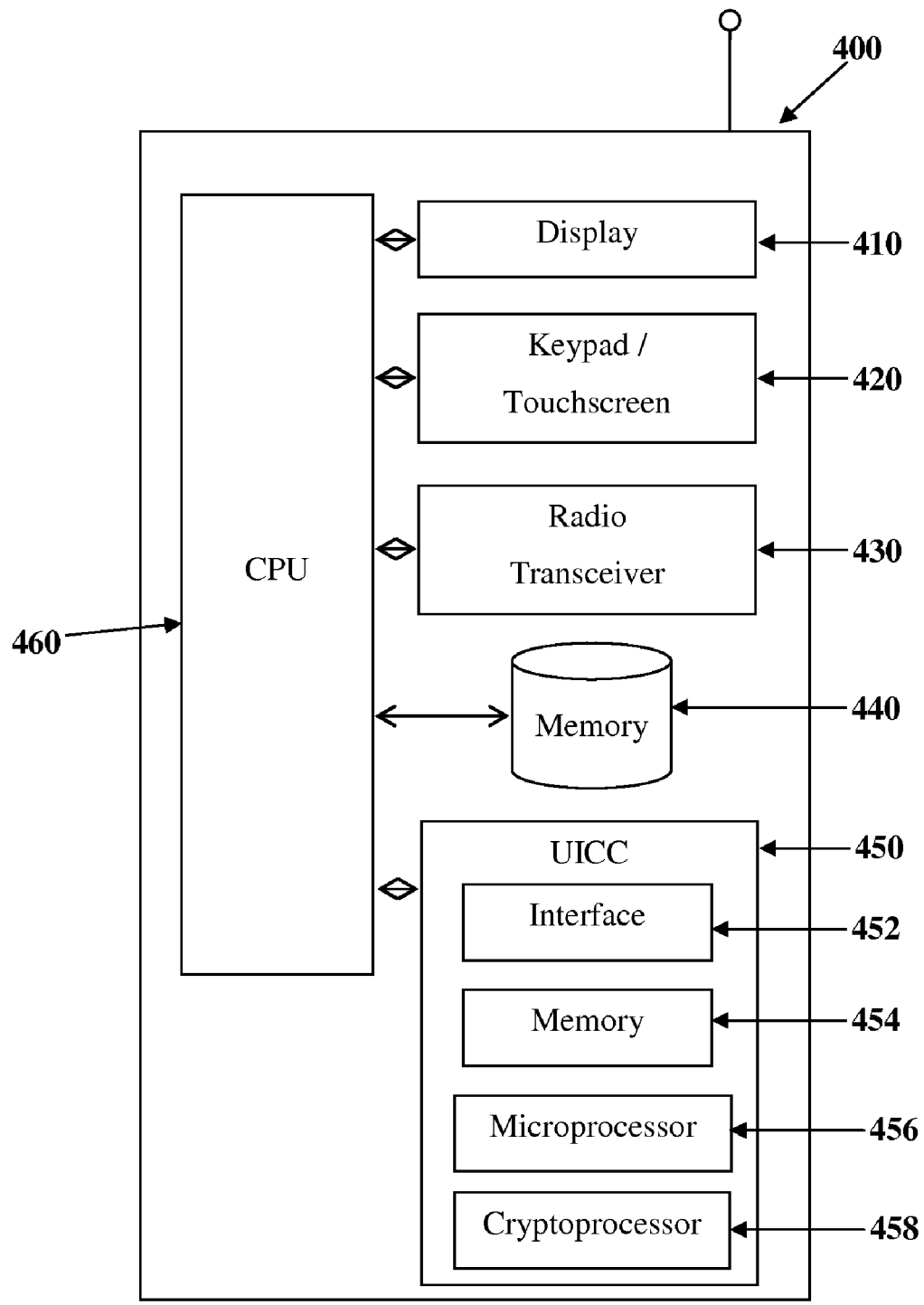
FIG. 4 illustrates a wireless device and UICC in accordance with embodiments of the present subject matter.

FIG. 4 illustrates a wireless device 400 operatively coupled to a UICC 450 in accordance with embodiments of the present subject matter. The wireless device 400 comprises a display 410, such as an LCD screen, a user input device 420 such as a keypad and/or touchscreen, and a radio transceiver 430 configured to communicate wirelessly with one or more operator networks in accordance with one or more predetermined protocols. The wireless device 400 further comprises a CPU 460 such as a microprocessor or microcontroller and associated electronics, and memory 440, such as RAM, ROM, Flash, optical, solid-state, magnetic, or other memory. The CPU 460 is operatively coupled to the display 410, user input 420, transceiver 430, memory 440 and UICC 450, for example via one or more data busses, for communicating therewith to send and/or receive instructions or data. The UICC 450 comprises a data interface 452 for operatively coupling with the wireless device 400 and/or CPU 460, internal memory 454 such as solid-state memory, an on-board microprocessor 456, and a cryptoprocessor 458.

Local identity information provided to the wireless device 400 via the radio transceiver 430 may be stored in memory 440 of the wireless device 400 and/or memory 454 of the UICC 450. The CPU 460 of the wireless device may execute instructions for configuring and storing the local identity information, as may the microprocessor 456 and/or cryptoprocessor 458. In some embodiments, the local identity information is used to configure a program or application which is stored in memory and executed by one or more of the CPU 460, the microprocessor 456 and the cryptoprocessor 458. The program or application may be a SIM, USIM, CSIM, or other application, for example. The program may be stored and executed at least in part by the UICC 450. The program may alternatively be stored and executed by the wireless device 400. In some embodiments, a supervisory program which coordinates the operation of plural SIM, USIM, and/or CSIM applications, or the like, may also be stored on and executed by the wireless device 400 and/or UICC 450.

Figure 5:
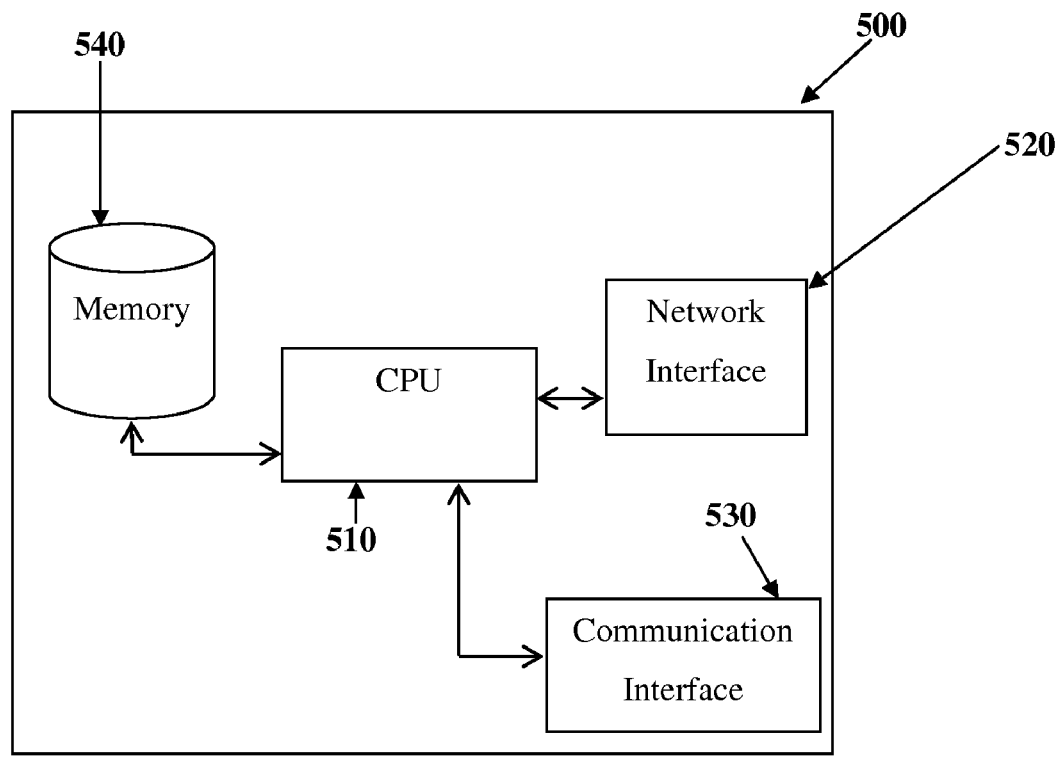
FIG. 5 illustrates an apparatus for enabling a wireless device for local operation with a foreign operator network, in accordance with embodiments of the present subject matter.

FIG. 5 illustrates an apparatus 500 for enabling a wireless device for local operation with a foreign operator network, in accordance with embodiments of the present subject matter. The apparatus 500 comprises a CPU 510, operatively coupled to a network interface 520, a communication interface 530, and memory 540. The CPU 510 is configured to execute program instructions stored in memory 540 to perform operations in accordance with the present subject matter. The CPU 510 may also be configured to access the memory 540 or another memory to read identity information instances stored therein, and communicate these via the network interface 520. The CPU 510 may further be configured to manage communication via communication interface 530, for example to conduct financial transactions. The CPU 510 may execute instructions to communicate with the operator network, via the network interface 520, for example to monitor the operator network so as to identify foreign wireless devices, communicate therewith, and monitor activity thereof.

The subject matter will now be described with reference to specific examples. It will be understood that the following examples are intended to describe embodiments of the subject matter and are not intended to limit the subject matter in any way.

It will be appreciated that, although specific embodiments of the subject matter have been described herein for purposes of illustration, various modifications may be made without departing from the spirit and scope of the subject matter. In particular, it is within the scope of the subject matter to provide a computer program product or program element, or a program storage or memory device such as a solid or fluid transmission medium, magnetic or optical wire, tape or disc, or the like, for storing signals readable by a machine, for controlling the operation of a computer and/or firmware according to the method of the subject matter and/or to structure its components in accordance with the system of the subject matter.

In addition, while portions of the above discuss the subject matter as it can be implemented using a generic OS and/or generic hardware, it is within the scope of the present subject matter that the method, apparatus and computer program product of the subject matter can equally be implemented to operate using a non-generic OS and/or can use non-generic hardware.

Further, each step of the method may be executed on any general computer, such as a personal computer, server or the like, or system of computers, and pursuant to one or more, or a part of one or more, program elements, modules or objects generated from any programming language, such as C++, C#, Java, P1/1, or the like. In addition, each step, or a file or object or the like implementing each said step, may be executed by special purpose hardware or a circuit module designed for that purpose.

As would be appreciated by one skilled in the art, the foregoing embodiments of the subject matter are examples and can be varied in many ways. Such present or future variations are not to be regarded as a departure from the spirit and scope of the subject matter, and all such modifications as would be obvious to one skilled in the art are intended to be included within the scope of the following claims.

The embodiments of the invention in which an exclusive property or privilege is claimed are defined as follows:

1. A method for enabling a wireless device for local operation with a foreign operator network, the method comprising:
   a. identifying the wireless device as foreign to the operator network; and
   b. transferring, via wireless communication, local identity information to the wireless device, the local identity information being configured for temporary use by the wireless device, the local identity information being further suitable for temporary use by one or more other wireless devices after said temporary use by the wireless device.

2. The method according to claim 1, wherein the local identity information corresponds to an identity recognized by the operator network as being associated with a local subscriber.

3. The method according to claim 1, the method further comprising:
   a. storing a plurality of different identity information instances in computer memory;
   b. accessing the computer memory to acquire the local identity information corresponding to a selected identity information instance stored therein, the selected identity information instance being marked as currently unused; and
   c. marking the selected identity information instance as currently in-use.

4. The method according to claim 3, the method further comprising:
   a. monitoring the wireless device for completion of temporary use of the local identity information; and
   b. upon completion of temporary use of the local identity information by the wireless device, marking the selected identity information instance as currently unused.

5. The method according to claim 1, the method further comprising:
   a. obtaining payment information via wireless communication with the wireless device, said payment information being configured for use in recovering payment related to temporary use of the local identity information by the wireless device in accordance with a predetermined service agreement; and
   b. initiating a request for payment based at least in part on said payment information.

6. The method according to claim 1, further comprising obtaining user authorization or verifying user pre-authorization before transferring the local identity information to the wireless device.

7. The method according to claim 1, wherein identifying the wireless device as foreign to the operator network comprises one or more of: monitoring communication operations of the operator network, monitoring databases or registries tracking foreign devices currently within jurisdiction of the operator network, and monitoring for user-generated request for services.

8. A method for preparing a wireless device for local operation with a foreign operator network, the method comprising:
   a. storing a plurality of different identity information instances in computer memory, each identity information instance comprising information suitable for temporary use by the wireless device for operation with the operator network as a local subscriber;
   b. identifying the wireless device as foreign to the operator network;
   c. selecting a currently unused identity information instance;
   d. marking the selected identity information instance as currently in-use;
   e. transferring, via wireless communication, the selected identity information instance to the wireless device for temporary use thereby;
   f. monitoring the wireless device for completion of temporary use of the selected identity information instance; and
   g. upon completion of temporary use of the selected identity information instance by the wireless device, marking the selected identity information instance as currently unused.

9. An apparatus for enabling a wireless device for local operation with a foreign operator network, the apparatus comprising one or more pieces of hardware operatively coupled to the operator network and comprising:
   a. a monitoring module configured to execute on a piece of hardware and further configured to monitor the operator network to identify the wireless device as foreign to the operator network; and
   b. an interface module configured to execute on the piece of hardware or another piece of hardware an further configured to transfer local identity information to the wireless device via the operator network, the local identity information being configured for temporary use by the wireless device, the local identity information being further suitable for temporary use by one or more other wireless devices after said temporary use by the wireless device.

10. The apparatus according to claim 9, wherein the local identity information corresponds to an identity recognized by the operator network as being associated with a local subscriber.

11. The apparatus according to claim 9, the apparatus further comprising computer memory having stored therein a plurality of different identity information instances, the apparatus configured to:
   a. access the computer memory to acquire the local identity information corresponding to a selected identity information instance, the selected identity information instance being marked as currently unused; and
   b. mark the selected identity information instance as currently in-use.

12. The apparatus according to claim 11, the apparatus further configured to:
   a. monitor, via the monitoring module, the operator network for completion of temporary use of the local identity information by the wireless device; and
   b. upon completion of temporary use of the local identity information by the wireless device, mark the selected identity information instance as currently unused.

13. The apparatus according to claim 9, the apparatus further comprising a payment module configured to execute on the piece of hardware or another piece of hardware and further configured to:
   a. obtain, via wireless communication with the wireless device, payment information, said payment information being configured for use in recovering payment related to use of the local identity information by the wireless device, in accordance with a predetermined service agreement; and
   b. initiate a request for payment based at least in part on said payment information.

14. A non-transitory computer program product comprising a memory having computer readable code embodied therein, for execution by a CPU, for performing a method for enabling a wireless device for operation with an operator network, the method comprising:
   a. identifying the wireless device as foreign to the operator network; and
   b. transferring, via wireless communication, local identity information to the wireless device, the local identity information being configured for temporary use by the wireless device, the local identity information being further suitable for temporary use by one or more other wireless devices after said temporary use by the wireless device.

15. The computer program product according to claim 14, wherein the local identity information corresponds to an identity recognized by the operator network as being associated with a local subscriber.

16. The computer program product according to claim 14, the method further comprising:
   a. storing a plurality of different identity information instances in computer memory;
   b. accessing the computer memory to acquire the local identity information corresponding to a selected identity information instance stored therein, the selected identity information instance being marked as currently unused; and
   c. marking the selected identity information instance as currently in-use.

17. The computer program product according to claim 16, the method further comprising:
   a. monitoring the wireless device for completion of temporary use of the local identity information; and
   b. upon completion of temporary use of the local identity information by the wireless device, marking the selected identity information instance as currently unused.

18. The computer program product according to claim 14, the method further comprising:
   a. obtaining payment information via wireless communication with the wireless device, said payment information being configured for use in recovering payment related to temporary use of the local identity information by the wireless device in accordance with a predetermined service agreement; and
   b. initiating a request for payment based at least in part on said payment information.

* * * * *

UNITED STATES PATENT AND TRADEMARK OFFICE
CERTIFICATE OF CORRECTION

PATENT NO. : 8,306,505 B2  
APPLICATION NO. : 12/854093  
DATED : November 6, 2012  
INVENTOR(S) : S. J. Bennett Page 1 of 1

It is certified that error appears in the above-identified patent and that said Letters Patent is hereby corrected as shown below:

In the Claims:

| COLUMN | LINE | ERROR |
|---|---|---|
| 13 (Claim 9, | 56 line 10) | "an" should read --and-- |

Signed and Sealed this  
Sixteenth Day of April, 2013

Teresa Stanek Rea  
*Acting Director of the United States Patent and Trademark Office*